Aug. 9, 1960   N. E. RISK ET AL   2,948,347
TORSION BAR CUSHIONING MEANS FOR TRACTOR EQUALIZER BAR
Filed March 4, 1959   3 Sheets-Sheet 1
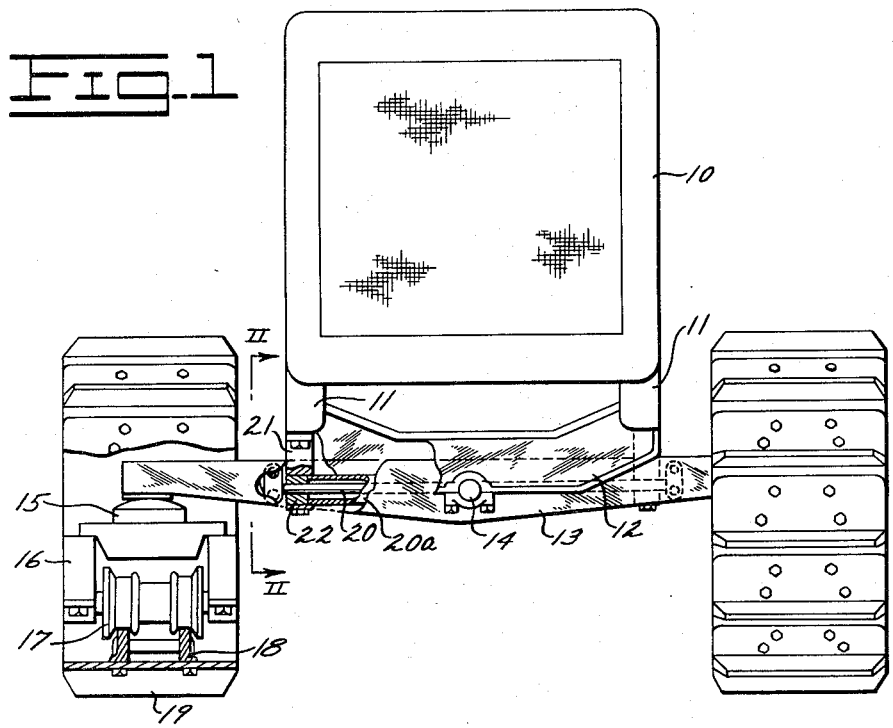
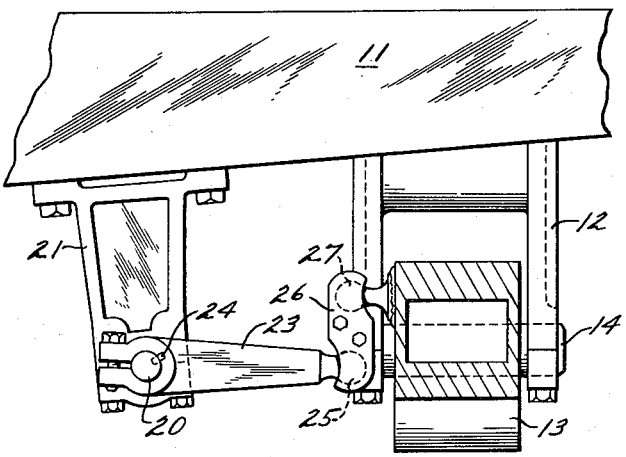
INVENTORS
NORMAN E. RISK
JESSE L. HOLDEN
BY
ATTORNEYS Aug. 9, 1960 N. E. RISK ET AL 2,948,347
TORSION BAR CUSHIONING MEANS FOR TRACTOR EQUALIZER BAR
Filed March 4, 1959 3 Sheets-Sheet 2
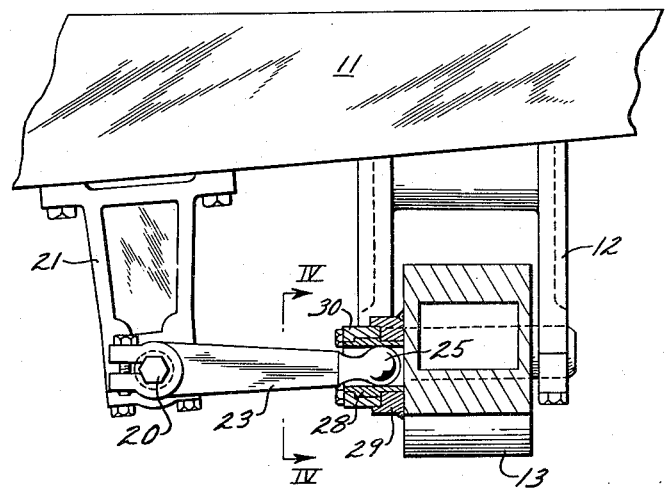
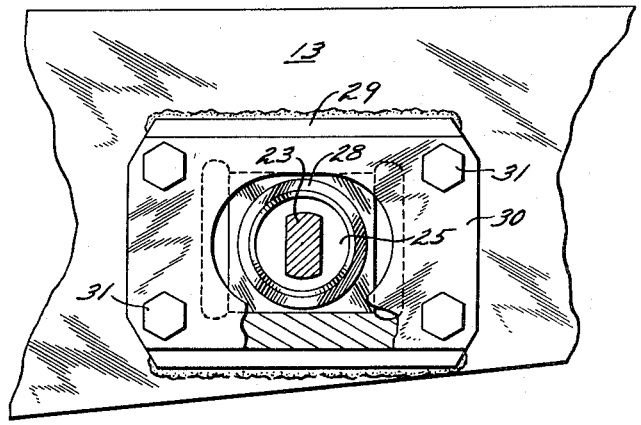
INVENTORS
NORMAN E. RISK
JESSE L. HOLDEN
BY
ATTORNEYS Aug. 9, 1960   N. E. RISK ET AL   2,948,347
TORSION BAR CUSHIONING MEANS FOR TRACTOR EQUALIZER BAR
Filed March 4, 1959   3 Sheets-Sheet 3
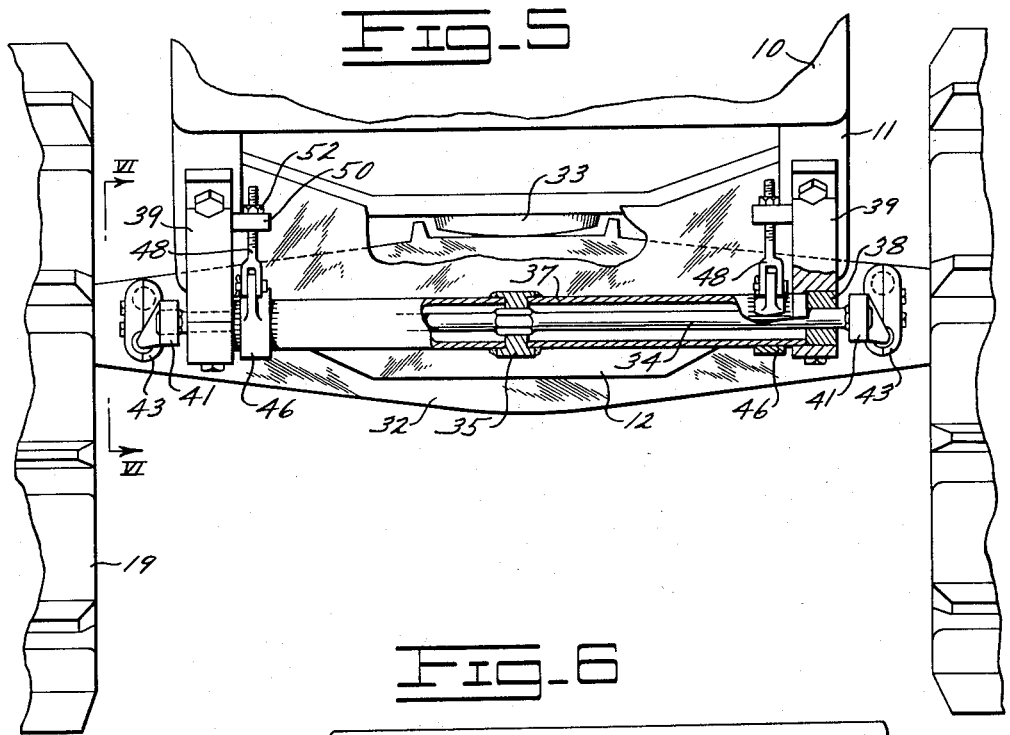
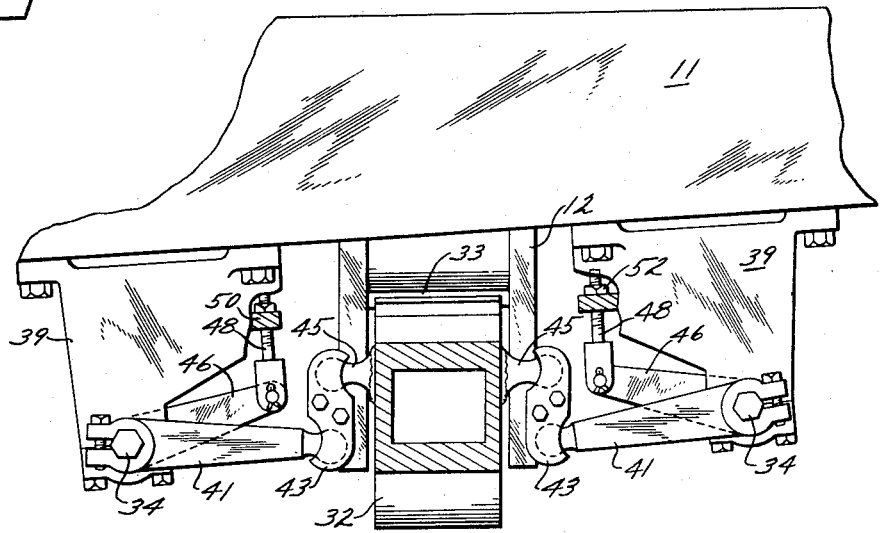
INVENTORS
NORMAN E. RISK
JESSE L. HOLDEN
BY
*Fryer and Johnson*
ATTORNEYS

United States Patent Office 2,948,347
Patented Aug. 9, 1960

2,948,347

TORSION BAR CUSHIONING MEANS FOR TRACTOR EQUALIZER BAR

Norman E. Risk, Peoria, and Jesse L. Holden, East Peoria, Ill., assignors to Caterpillar Tractor Co., Peoria, Ill., a corporation of California Filed Mar. 4, 1959, Ser. No. 797,142

3 Claims. (Cl. 180—9.5)

This invention relates to improvements in front end suspension for track-type tractors or the like and particularly to cushioning means for the equalizer bar of such tractors.

In some types of track-type tractors, the main frame supports a power unit and transmission mechanism while truck frames spaced on opposite sides of the main frame carry endless tracks driven by the power unit. Truck frames which support the track assemblies are connected adjacent their rear ends to the main frame through sprocket shafts which carry sprockets for driving the endless tracks. This connection permits the truck frames to pivot about the axis of the sprocket shafts so that their forward ends can swing upwardly or downwardly independently of each other as the tractor travels over obstacles or uneven terrain. Toward its forward end, the main frame is supported on a transverse member extending between the truck frames and often in the form of a rigid part referred to as an equalizer bar. This equalizer bar is sometimes pivoted and sometimes provides a free rocking support with respect to the main frame and rests upon suitable pads on the truck frames at its opposite ends so that upon raising or lowering of either of the track assemblies with respect to the other, it is free for rocking motion. In some tractors, resilient or cushioning means is provided to resist rocking motion of the equalizer bar and thus increase the stability and smoothness of operation of the tractor. It is to such cushioning means that the present invention is directed and it is the object of the present invention to provide improved cushioning means for this purpose which are simple, inexpensive and durable in construction and which are arranged entirely above the plane of the lower surface of the equalizer bar so as not to interfere with maximum ground clearance of the tractor.

Further objects and advantages of the invention are made apparent in the following specification wherein reference is made to the accompanying drawings illustrating two different forms which the invention may assume.

In the drawings:

Fig. 1 is a view in front elevation of a tractor embodying the present invention with parts broken away to disclose structural details;

Fig. 2 is an enlarged fragmentary section taken on the line II—II of Fig. 1;

Fig. 3 is a view like Fig. 2 illustrating a modification of the mechanism shown in Fig. 2;

Fig. 4 is an enlarged fragmentary section taken on the line IV—IV of Fig. 3;

Fig. 5 is a fragmentary front elevation of a tractor with parts broken away illustrating a modified from of the invention shown in Fig. 1; and Fig. 6 is an enlarged fragmentary view taken on the line VI—VI of Fig. 5.

In Fig. 1 of the drawings, the front end of a tractor is illustrated at 10 as supported on a pair of main longitudinal frame members 11 connected adjacent their forward ends by a transverse frame member 12. An equalizer bar 13 supports the transverse member 12 and the weight of the forward end of the tractor through a pivot pin 14 and is in turn supported at its outer ends by pads 15 on the truck frames which are indicated at 16. The ends of the equalizer bar are slidable on the pads 15 so that it can move laterally with respect to them during rocking motion caused by raising or lowering of the truck frames. Conventional track rollers, such as shown at 17, roll on the usual endless tracks 18 which are articulated and connected with track shoes 19.

The means for cushioning or providing resilient resistance to rocking motion of the equalizer bar comprises a torsion bar 20 extending transversely of the main tractor frame and parallel to the equalizer bar and supported by brackets 21 secured to and extending downwardly from the main frame members 11. The torsion bar is rotatably supported with respect to the brackets in bushings 22 carried in the brackets and may, if desired, be encased in a surrounding tube 20a. A lever 23 is connected to each end of the torsion bar 20 and fixed against rotation with respect thereto as by a key shown at 24 in Fig. 2 or as by a hexagonal connection such as illustrated in Fig. 3. The opposite end of each lever 23 is formed with a ball-shaped end 25 and is connected as by a link 26 with a ball fitting 27 secured to the equalizer bar 13. Through this construction, rocking motion of the equalizer bar with respect to the tractor frame is resiliently resisted because it imparts swinging movement in opposite directions in vertical planes to the levers 23 which are connected by the torsion bar. The purpose of the links 26 is to accommodate the movement of the ball fitting 27 out of the vertical plane in which the lever 23 moves when the fitting 27 travels in an arc upon pivotal movement of the equalizer bar about its central support 14.

A modification of the invention which eliminates the link 26 is illustrated in Fig. 3 wherein the ball-shaped end 25 of the lever 23 is shown as slidably fitting a tubular socket 28. The socket 28 is also slidable in a generally horizontal plane transversely of the equalizer bar 13. This is accomplished by securing a track or guide way 29 to the equalizer bar for reception of the socket 28 which is retained for sliding movement in the track by a cover plate 30 secured in place as by cap screws 31, best illustrated in Fig. 4. This assembly, like that illustrated in Fig. 2, accommodates the arcuate movement of the ball fitting on the equalizer bar as well as the arcuate movement described by the ball-shaped end of the levers 23.

A modification of the invention is shown in Figs. 5 and 6 wherein the transverse frame member or saddle 12 is illustrated as having an inverted U-shaped cross section and an equalizer bar 32 fits within the space provided by the U-shape and supports the weight of the tractor through a centrally disposed convex pad 33 within the saddle, thus eliminating the pivot pin shown at 14 in Figs. 1 and 2. This type of construction is frequently used on large tractors and this modification of the invention provides additional torsion bar cushioning means to accommodate the greater forces encountered. As shown in Figs. 5 and 6, a pair of torsion bars 34 are provided, one disposed forwardly and one to the rear of the equalizer bar 32. Each torsion bar has a hexagonal central portion or other similar means for connecting it against rotation to a wall or plate 35 through which it extends and which is centrally positioned and fixed with respect to a tubular housing assembly 37. The torsion bars are rotatably supported adjacent their ends in bushings 38 held in brackets 39 secured to and depending from the main frame members 11.

Levers 41 corresponding to the levers 23 of Fig. 2 are connected to the ends of the torsion bars and to the equalizer bar by links 43 and ball fittings 45 on both the front and back surfaces of the equalizer bar in the manner described in connection with Fig. 2 or alternately by means such as shown in Fig. 3.

Through the modifications illustrated in Figs. 5 and 6, the same type of resistance to oscillation of the equalizer bar is obtained but the resistance may be increased because of the use of two torsion bars rather than 1.

With the type of equalizer bar that does not employ a central pivot pin, the forward end of the tractor is held in contact with the bar only by gravity and is likely to rise and fall slightly in passing over rough terrain which produces a pounding effect between the pad 33 and the equalizer bar. To reduce this effect, levers 46 are secured against rotation adjacent opposite ends of each of the tubular assemblies 37 and the outer end of each lever 46 is connected as by an adjusting screw 48 with the fractor frame by means of a lug 50 which projects from each of the brackets 39 secured to the tractor frame. A nut 52 on each of the screws 48 enables the levers 46 to be drawn upwardly toward the tractor frame to rotate the tubular assembly 37 and apply a preload to the torsion bar within it through its central connection with the plate 35.

In both of the modifications herein disclosed, the entire resilient assembly which resists rocking of the equalizer bar is disposed above the plane of the lowest part of the equalizer bar so as not to reduce the ground clearance of the tractor.

We claim:

1. In front end suspension for tractors wherein a cross member of the tractor main frame rests on an equalizer bar which bridges the tractor truck frames, resilient means to resist rocking movement of the equalizer bar with respect to the tractor comprising a torsion bar supported by the tractor in a position substantially parallel to the equalizer bar, and means connecting the ends of the torsion bar to the equalizer bar at points on opposite sides of its center, said means comprising levers each fixed against rotation to the torsion bar, and a link with a ball and socket joint connecting it at one end to each said lever and at the other end to the equalizer bar to permit rocking movement of the equalizer bar and swinging movement of the lever about the axis of the torsion bar.

2. In front end suspension for tractors wherein a cross member of the tractor main frame rests on an equalizer bar which bridges the tractor truck frames, resilient means to resist rocking movement of the equalizer bar with respect to the tractor comprising a torsion bar disposed parallel to the equalizer bar, bracket means supporting the torsion bar relative to the tractor, a lever fixed to each end of the torsion bar, and a connection between each lever and the equalizer bar comprising a socket receiving the end of the lever for sliding movement, and means securing the socket for sliding movement relative to the torsion bar.

3. In a tractor front end suspension comprising an equalizer bar which bridges the tractor truck frames and a transverse member on the tractor which rests centrally on top of the equalizer bar, means to resist rocking of the equalizer bar relative to the tractor comprising, a torsion bar parallel to the equalizer bar, lever means connecting the ends of the torsion bar with the equalizer bar at points on opposite sides of its center, adjustable means for applying torque centrally of the torsion bar to create a resilient force tending to prevent upward movement of the tractor relative to the equalizer bar, said last means comprising lever means for applying a twisting force to a point centrally of the torsion bar and threaded adjusting means connecting the lever means with the tractor.

References Cited in the file of this patent

UNITED STATES PATENTS

| | | |
|---|---|---|
| 2,063,035 | Fuller | Dec. 8, 1936 |
| 2,164,602 | Valletta | July 4, 1939 |
| 2,194,832 | McIntyre | Mar. 26, 1940 |
| 2,786,724 | Armington | Mar. 26, 1957 |
| 2,840,390 | Walker | June 24, 1958 |

FOREIGN PATENTS

| | | |
|---|---|---|
| 928,813 | Germany | June 10, 1955 |